United States Patent [19]

Reformato

[11] Patent Number: 4,910,760
[45] Date of Patent: Mar. 20, 1990

[54] NETWORK VERIFICATION EVALUATION TESTING SYSTEM

[75] Inventor: John R. Reformato, East Meadow, N.Y.

[73] Assignee: NYNEX Corporation, White Plains, N.Y.

[21] Appl. No.: 289,350

[22] Filed: Dec. 23, 1988

[51] Int. Cl.$^4$ .................................... H04M 15/00
[52] U.S. Cl. ............................... 379/13; 379/15; 379/6
[58] Field of Search ............... 379/9, 10, 13, 15, 16, 379/18, 6

[56] References Cited

U.S. PATENT DOCUMENTS 3,980,839  9/1976  Hutcheson ........................... 379/15

Primary Examiner—Stafford D. Schreyer
Attorney, Agent, or Firm—Loren C. Swingle

[57] ABSTRACT

A system and method are disclosed for testing a switched telecommunications network by utilizing a terminating transponder unit 410 to respond with a unique identification code over switched network 300 following the receipt of a test signal from an originating micro logic terminal unit 210 over switched network 300, both units operating under the control of a central general purpose mini-computer 100.

15 Claims, 3 Drawing Sheets

NETWORK VERIFICATION EVALUATION TESTING SYSTEM

FIELD OF THE INVENTION

The present invention relates to telecommunications networks. More specifically, the present invention relates to the automated testing of the routing and billing capabilities of a switched telecommunications network.

BACKGROUND OF THE INVENTION

In accordance with the prior art, Message Usage Recording and Billing Accuracy (MURBA) Logic Terminal Units (LTUs) are installed in telephone company (TELCO) central offices. These LTUs provide access to TELCO central office lines to enable one way dial through billing accuracy testing of the public switched network under control of a centralized host computer. This arrangement enables the host computer to remotely generate and record test calls originating and terminating at offices where the logic terminals have been installed. Test call records are then compared with billing records to evaluate billing accuracy. Under the MURBA system, a centrally located host computer accesses LTUs that have been installed in selected central offices. The remote host computer then, via the LTU, simulates typical customer telephone calls over the public switched network. This procedure generates a control sample of originating calls representative of all calls generated for that office or area. All billing details of this control sample are recorded in the on-line database of the host computer. The host computer rates (calculates the billing of) the generated calls, and compares the results with records generated by the TELCO accounting system. Management summaries and discrepancy reports are then produced.

In order to transform the MURBA system from a billing verification system into a system which would verify the proper operation of the switched network, the following changes would be beneficial.

1. Positive identification of the termination point should take place when test calls ar made. The present MURBA system operates in the following way: When a prior art LTU receives a test call it responds wit a single tone to the originating LTU. Therefore, the originating LTU only verifies that another LTU was reached, not whether a particular LTU was reached.

2. It would b beneficial for a test system to employ devices that were inexpensive enough to be deployed ubiquitously throughout the network, enabling complex, real-time testing of any combination of network origination and termination points.

3. The originating LTU should dependably control and monitor the duration of the test call. The prior art system simply transmits a signal to the terminating LTU, which sends a signal back to the originating LTU. If other types of signals are received at the originating LTU, the are sometimes mistaken for the return signal of a far-end LTU (such as when a component frequency of a foreign signal matches the LTU signal frequency). Therefore, the timing function of the billing process cannot be consistently validated by the use of LTUs.

4. A network verification system should be able to test terminating access billing. Since the originating end of a test call disconnects before the terminating end of a test call, the prior art MURBA system cannot detect when the terminating end disconnects. In today's telecommunications environment, one TELCO may originate a call, an Interexchange Carrier (IEC) may transport the call over long distances, and a second TELCO may terminate the call. The first TELCO bills the IEC for the origination of the call, and the second TELCO bills the IEC for the termination of the call. IECs are therefore interested in verifying when the terminating end disconnects, in order to verify that the billing from the terminating TELCO is correct. The MURBA system utilizes standard 103 Type data sets in each LTU. The far end data set periodically monitors for an incoming signal. If consecutive monitoring cycles show that no signal is present, the LTU disconnects. Because of this process, the near end LTU (and therefore the centralized host computer) cannot determine when the far end LTU actually disconnects. The termination billing therefore cannot be accurately verified by using the prior art MURBA system.

5. A network verification system should be capable of testing non-billed calls (e.g., local calls and operator assisted calls). This is not presently done because toll records would not be produced for these calls by the TELCO Accounting Department for later comparison with MURBA results.

6. A network verification system should be able to test switch routines and translation functions following a switch cutover (placement of a new or replacement switching machine in the network). Tests should be performed to verify that the new switch can correctly direct calls to other switches or access points in the network, or verify that other switches and access points have been properly modified to direct calls to the new switch, on a real-time basis. If prior art LTUs were placed at every switching machine in the TELCO network, automated test calls could be made to and from the new switch, but the results of the test would have to await the receipt of the billing records (which would not include non-billed calls) in order to determine that the calls were properly routed.

7. An enhanced system should be able to handle Touch Tones, as well as dial pulses, both for call set-up and testing. The use of Touch Tones would allow direct access to the system from Touch Tone phones, prevent the misinterpretation of return signals, and allow for complex signaling between LTUs.

8. It would be beneficial for the enhanced system to perform diagnostics on the transmission quality of the network simultaneous to its other test capabilities.

9. Finally, it would be beneficial for a network verification system to begin timing from any pre-selected dialed digit. Since some switching machines begin sending calls to the next switching machine after receiving a pre-selected number of dialed digits (for example, some switches begin outgoing call set-up after the third dialed digit), small errors in billing could go undetected by using the MURBA system, which begins timing after all digits are dialed. IECs are particularly interested in those seemingly small amounts of time when repeated on millions of calls.

Accordingly, there exists a need for devices and methods for positively identifying the far-end test device, economically and ubiquitously placing test devices throughout the TELCO network, accurately controlling and monitoring the timing of test calls, testing of transmission characteristics of the network, and verification of the call completion capabilities of the network, including non-billed calls.

SUMMARY OF THE INVENTION

In accordance with the present invention, a controller apparatus, designated as a Micro-Logic Terminal Unit (MLTU), connects to a responder apparatus, designated as a Terminating Transponder Unit (TTU), over a telecommunications network. The TTU transmits a unique identification code back to the MLTU. The MLTU then verifies that the intended TTU was accessed. By associating a general purpose computer with various MLTU's the switched telecommunications network can be tested on a real-time, remote, mechanized basis. The combined system is designated a Verification and Evaluation Testing System (VETS).

Further embodiments of the instant invention include: accurately controlling the duration of a test call by repetitively transmitting the identification code from the TTU as often as a pre-determined signal from the MLTU is received by the TTU, transmission testing of the network by embedding transmission test devices within the MLTUs and TTUs, providing access by Touch Tones or dial pulses, and timing each dialed digit of a test call in order to verify billing to IECs.

DETAILED DESCRIPTION OF THE INVENTION

Figure 1:
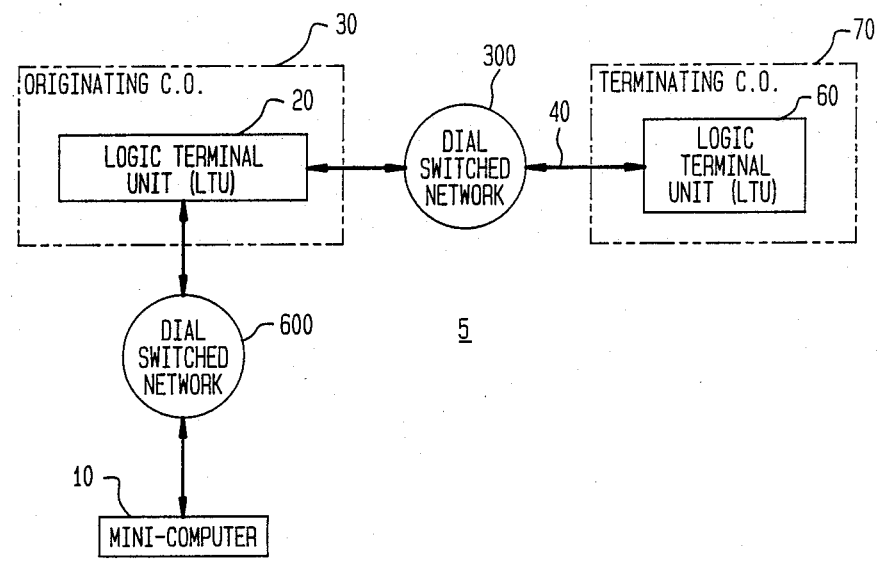
FIG. 1 is a drawing of a prior art MURBA system.

To better comprehend the present invention, a description of the prior art MURBA system 5 on FIG. 1 will be beneficial. FIG. 1 depicts mini-computer 10 which is connected to first LTU 20 via first dial switched network 600. LTU 20 resides within originating central office 30. LTU 20 is connected to second LTU 60 via second dial switched network 300 and incoming line 40. LTU 60 resides in terminating central office 50.

Mini-computer 10 directs LTU 20 to dial up LTU 60 over dial switched network 300. When an incoming call is connected to LTU 60, LTU 60 transmits a single frequency tone over incoming line 40. When the tone arrives back at LTU 20 via dial switched network 300, LTU 20 conveys the time of receipt of the tone to mini-computer 10 over dial switched network 600. Further, LTU 20 can transmit a signal to LTU 60, and LTU 60 will remain connected until the signal is terminated by LTU 20, at which time LTU 60 disconnects from dial switched network 300.

Periodically, the calling and response data resident in mini-computer 10 is manually compared to the central office billing records generated by the Accounting Department of the Telco, which are typically generated several days after the calls are placed. Discrepancies between the data and records are then investigated.

Figure 2:
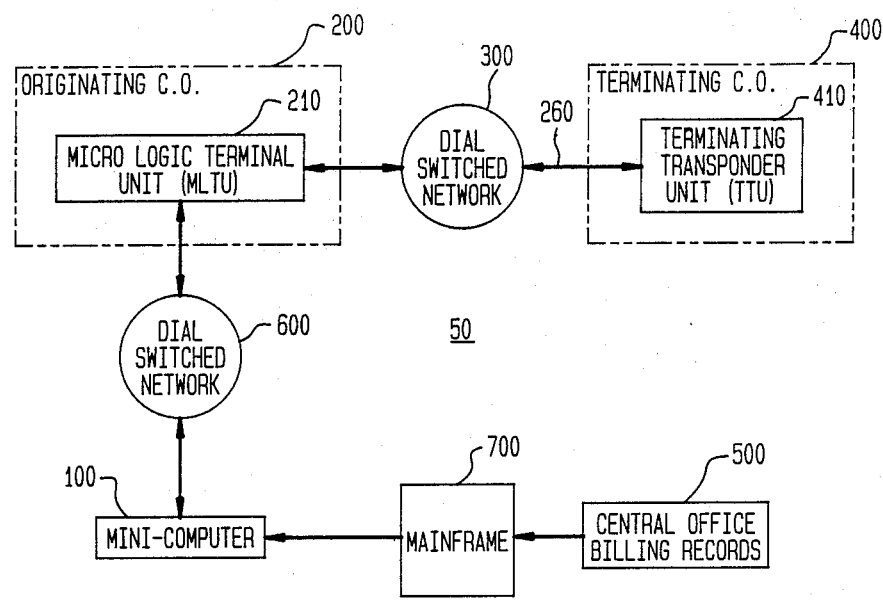
FIG. 2 is a drawing of a complete VETS testing system.

FIG. 2 shows an overview of the instant VETS testing system 50. Minicomputer 100, such as a Sequent Model S27, directs the operation of the controller, MLTU 210 in Originating Central Office 200, via first dial switched network 600. Mini-computer 100, based upon a predetermined testing plan, illustratively directs MLTU 210 to dial up and connect to incoming line 260 at a remote responder, such as TTU 410 in terminating central office 400, over second dial switched network 300. TTU 410 responds via dial switched network 300 to MLTU 210 with a positive identification code (e.g., unique series of Touch Tones) identifying TTU 410. Mini-computer 100 is therefore able to immediately compare this identification to the expected destination code. This comparison is stored in mini-computer 100 for later analysis. This constitutes major departure of the present invention over the prior art UURBA system 5 in FIG. 1.

By modifying the components, the duration of a test call can be accurately controlled and monitored by MLTU 210. The modified system works in the following way. When a call is placed over switch network 300 from MLTU 210 to TTU 410, TTU 410 goes off hook and transmits, for example, a unique six digit identification code using Touch Tone pulses back to MLTU 210. TTU 410 then waits for, illustratively, 250 ms. If MLTU 210 sends a predetermined signal, such as the "*" Touch Tone pulse (the pair of frequencies associated with the pressing of the "*" button on a Touch Tone phone) within that time, TTU 410 will represent the six digit identification code. This sequence will continue as often as the "*" signal is received by TTU 410. TTU 410 will go back on hook when the "*" Touch Tone use is not received within 250 ms of the last transmission. The identification code is preset in TTU 410 at the time of installation. In this way, MLTU 210 controls the duration of the test call, and can accurately determine when TU 410 disconnects, allowing for verification of terminating access billing.

Mini-computer 100 monitors and times each digit dialed by MLTU 210, which in turn allows VETS system 50 to verify the billing of IEC calls if dial switched network 300 includes an IEC access point, depending on the number of dialed digits that triggers originating central office 200 to begin outpulsing the dialed digits over dial switched network 300. Mini-computer 100 can be pre-programmed with the number of dialed digits that originating central office 200 will receive from an originating calling station (such as MLTU 210) before it begins outpulsing to the next switching point in the network (such as TTU 410).

TTU 410 is relatively inexpensive compared with the cost of an LTU or MLTU, allowing the TTUs to be placed throughout the TELCO network, such as associating one with every NNX number group. Combining this ubiquitous coverage with the ability of VETS system 50 to be able to determine whether the proper TTU has been accessed, various tests of the network can be accomplished. Under the VETS system 50, MLTU 210 and associated mini-computer 100 can determine on a real-time basis whether or not dial switched network 300 is directing calls to their proper destinations, by comparing the received identification codes with the codes associated with the intended destination points. If the comparison does not match, origination-destination pairs that are not working properly can be quickly identified, allowing for quick and efficient repair. If no error is detected in the dial switched network, comparison of the test results with the central office billing records 500 via mainframe 700, such as an IBM Model 3090, can be made to verify the accuracy of the TELCO billing mechanism.

Figure 3:
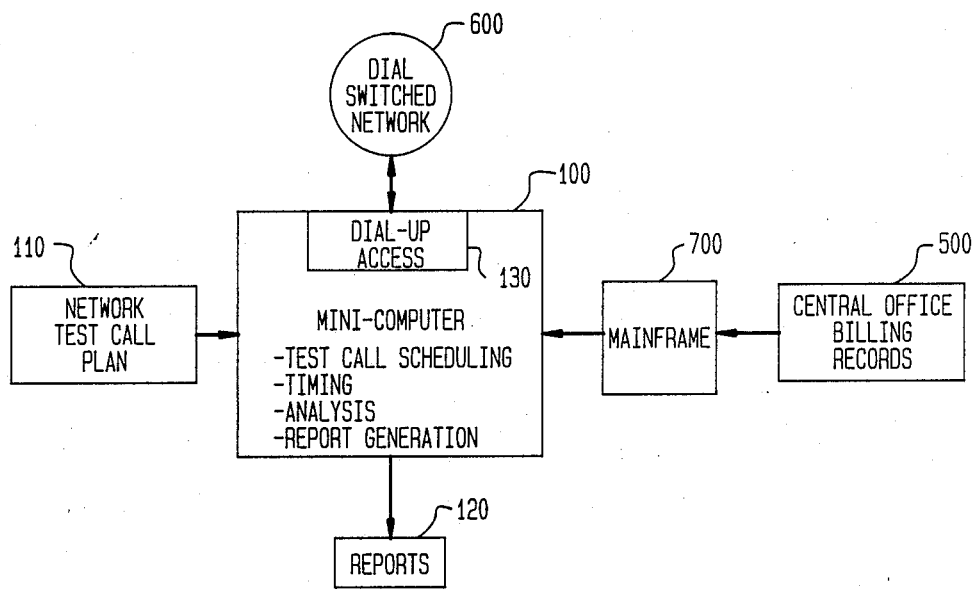
FIG. 3 is a schematic of the central computer.

FIG. 3 is a more detailed schematic of mini-computer 100. Mini-computer 100 controls the operation of the VETs testing system 50 (FIG. 2) by scheduling test calls, directing the progress of test calls on a real-time basis, monitoring the results of the test calls, analyzing the test calls from the viewpoint of whether or not the proper TTU was accessed, or whether data transmissions have been handled properly by dial switched network 300 (not shown) and the generating of reports 120 detailing the results of the tests. The test call scheduling can be inputted into mini-computer 100 by an operator at the keyboard of mini-computer 100, based on network test call plan 110. Dial switched network 600 and mini-computer 100 are accessed by dial-up access 130, which would illustratively be a modem with auto-dial capability. Mini-computer 100 can, at a later time, compare the results of the test calls, including various durations of calls, with central office billing records 500 as accumulated and stored in mainframe 700, when they become available.

Figure 4:
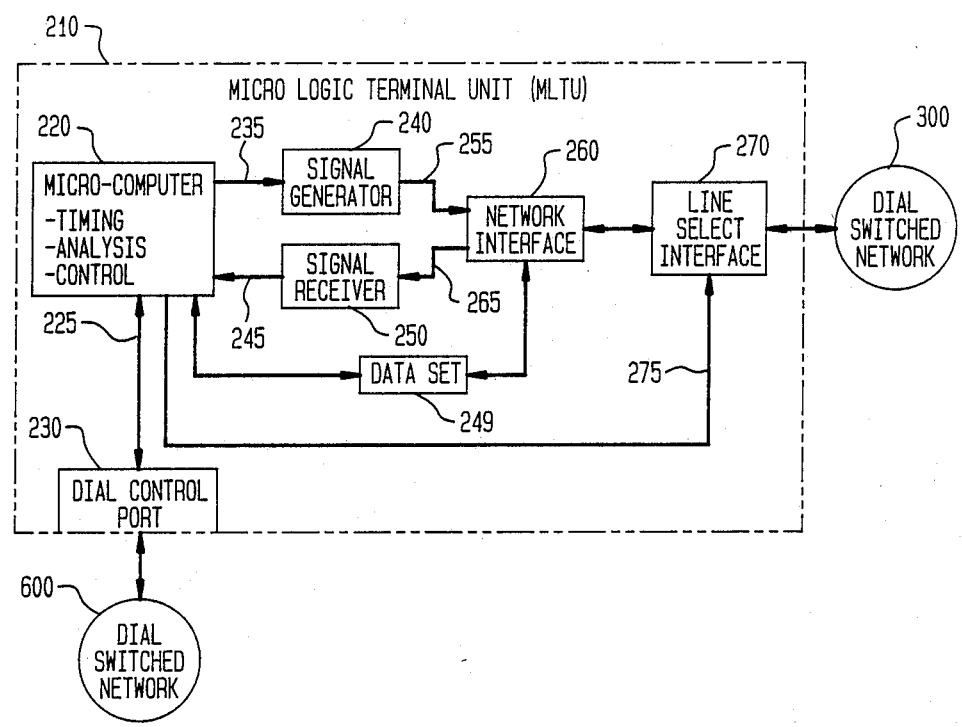
FIG. 4 is a schematic of an MLTU.

FIG. 4 provides additional detail concerning MLTU 210. MLTU 210 receives instructions over dial switched network 600 from mini-computer 100 (not shown) via dial control port 230, which would illustratively be a combination of a Bell System 103 Type Data Set and an auto-answer Rockwell-Hescom Model 9120 Ring Detector Timer, which communicates, via line 225, with micro computer 220 comprising circuitry supported by, for example, an INTEL 8085 Circuit, wherein the EPROM contains instructions to simulate various functions of a telephone user. Micro compute 220 controls the operation of MLTU 210. Micro computer 220 instructs Line Select Interface 270, such as a Rockwell-Hescom 9122-00 Line Select Relay Module, via line 275, to acquire an outgoing line. Micro computer 220 then instructs signal generator 240, such as a Mostek MK 50B9 integrated circuit, via line 235, to generate DTMF (Dual Tone Multi-Frequency) Touch Tone signals representative of a pre-selected destination TTU as instructed by micro-computer 220 over dial switched network 300 via line 255, network interface 260, such as a Rockwell-Wescom 7301 Repeat Coil, and line select interface 270. As each digit is dialed, a timing signal is sent from micro-computer 220 to mini-computer 100 to allow for the timing of each digit dialed. When the Touch Tone identification code is received at signal receiver 250, such as a Teltone M957 integrated circuit, from TTU 410 (not shown) over dial switched network 300, line select interface 270, and network interface 260, signal receiver 250 transforms the received Touch Tone signal into a digital signal, which is sent over line 245 to micro-computer 220. Micro computer 22 then, based upon the instructions received from mini-computer 100 via dial switched network 600 and dial control port 230, determines whether or not a "*" signal should be generated by signal generator 240 to TTU 410 to continue the test call. Mini-computer 100 then verifies that the proper TTU has responded by comparing the response with the identification code of the intended destination TTU. When the duration of the test call that was pre-specified by mini-computer 100 is reached, micro computer 220 causes the cessation of the generation of additional "*" signals from signal generator 240, causing TTU 410 to disconnect. If MLTU 210 does not receive an identification code within a pre-selected time period after sending a "*" signal, MLTU 210 can determine that TTU 410 has been disconnected. MLTU 210 is then ready to receive further instructions from mini-computer 100 for additional test calls to be placed over dial switched network 300.

Data set 249 can be advantageously accessed by microcomputer 220 to transmit and receive data transmissions from another MLTU via network interface 260 and line select interface 270. Mini-computer 100 can thereby direct an outgoing data signal to be transmitted from MLTU 210 to another MLTU via dial switched network 300, which could include intermediate packet switches, and the distant MLTU would send back to MLTU 210 the same data communication that it received utilizing its associated data set. Mini-computer 100, via MLTU 210, can then compare the transmitted data communication with the incoming data signal to measure the performance of dial switched network 300, including intermediate packet switches. Similarly, mini-computer 100 can perform analog signal transmission tests on dial switched network 300 by causing "*" Touch Tones to be sent continuously from MLTU 210 to TTU 410, causing TTU 410 to continuously transmit its six digit identification code back to MLTU 210, allowing mini-computer 100 to check the consistency of the received repetitive analog signals. This centralized, automated data transmission testing capability, using the in-place VETS network 50, results in manpower and equipment savings, as well as increased testing flexibility.

Figure 5:
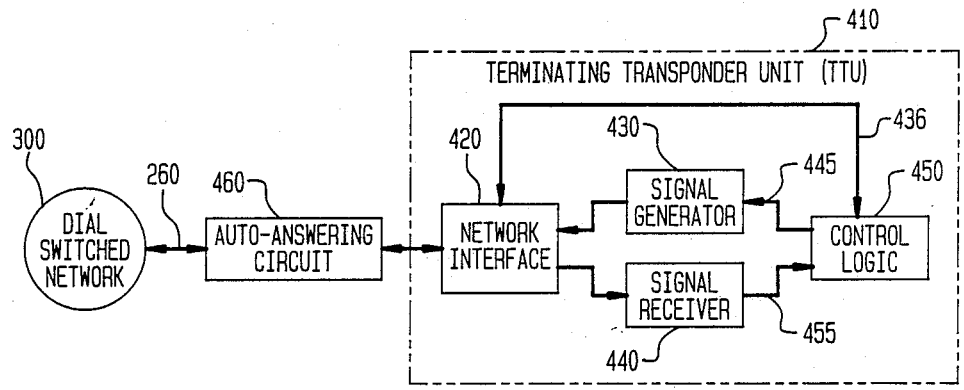
FIG. 5 is a schematic of a TTU.

FIG. 5 shows TTU 410 in greater detail. When a call is placed from MLTU 210 (not shown) over dial switched network 300, automatic answering circuit 460, such as a Rockwell-Hescom Model 9120 Ring Detector Timer, will establish a connection through network interface 420 to signal receiver 440, which will transform the received DTMF signal to a digital signal, which is passed via line 455 to control logic 450, illustratively comprising a series of 7400 Series integrated circuits and "555" Timers. Control logic 450 directs signal generator 430, via line 445, to transmit the 6 digit identification code uniquely associated with TTU 410 to MLTU 210 via network interface 420, auto-answering circuit 460, and dial switched network 300. If within 250 ms a "*" Touch Tone pulse is received from line 260 through auto-answering circuit 460, network interface 420, and signal receiver 440 to control logic 450, control logic 450 ill again direct signal generator 430 to generate the identification code via network interface circuit 420 over dial switched network 300. If 250 ms elapse without the receipt of another "*" Touch Tone pulse, control logic 450 will direct network interface 420, via line 436, to disconnect from dial switched network 300, thereby terminating the test call.

In this way, referring again to FIG. 2, dial switched network 300 can be automatically tested under the control of mini-computer 100 to see if it properly connects originating points with terminating points, and the TELCO central office billing records 500 can be tested to monitor both the billing of the proper calls, and the billed duration of those test calls. Because 6 digit Touch Tone identification codes are utilized, miscellaneous signals received at MLTU 210 will not be mistaken for TTU responses; therefore, the test results will be accurate as to destination and duration of test calls.

Finally, the above-described embodiment of the invention are intended to be illustrative only. Numerous alternative embodiments may be devised by those skilled in the art without departing from the spirit and scope of the following claims.

I claim:

1. A responder apparatus for use in testing the routing capabilities of a switched telecommunications network, the apparatus comprising:

means for automatically connecting to the network in response to an incoming call over the network, and means for transmitting a pre-determined identification code over the network subsequent to connecting to the network.

2. The apparatus of claim 1 further comprising:

means for receiving a pre-determined incoming test signal over the switched telecommunication network, means associated ith the receiving means for determining that the signal is a valid test signal, and timing means associated with the transmitting means and the determining means for casing the transmitting means to re-transmit the identification code if the signal is received within a pre-selected time period of the previous transmission of the identification code.

3. The apparatus of claim 1 wherein said signal comprises Touch Tones.

4. The apparatus of claim 1 wherein said identification code comprises Touch Toes.

5. A responder apparatus for use in testing the routing of a switched telecommunications network, the apparatus comprising:

network interface for establishing connection to the telecommunications network, a control logic for determining whether a pre-designated test signal has been received over the network and for initiating the transmission of an identification code onto the network, a signal receiver interconnecting the network interface and the control logic for the transformation of a received analog signal from the network interface to a digital signal into the control logic and a signal generator interconnecting the control logic and the network interface for the transformation of the digital identification code from the control logic to an analog signal into the network interface.

6. A controller apparatus for use in testing a telecommunications network comprising:

means for accessing a destination point over the network, means associated with the accessing means for receiving an identification code over the network from the destination point, and means associated with the receiving means for comparing the received identification code with the identification code of the intended destination.

7. The apparatus of claim 6 further comprising:

means for transmitting a pre-determined signal over the network, and timing means associated with the receiving means and the transmitting means for determining if the identification code is received within a pre-determined time of transmitting the signal.

8. The apparatus of claim 6 wherein said signal comprises Touch Tones.

9. The apparatus of claim 6 wherein said identification code comprises Touch Tones.

10. The apparatus of claim 6 further comprising:

means for sending data signals over the network to the destination point, means associated with the sending data means for receiving data signals over th network from the destination point, and means associated with the sending data means and receiving data means for comparing the data signals sent with the data signals received.

11. A telephone network testing system comprising a controller and a responder, the controller further comprising:

means for accessing a destination point over the network, means associated with the accessing means for receiving an identification code over the network from the destination point, and means associated with the receiving means for comparing the received identification code with the identification code of the intended destination., the responder further comprising:

means for automatically connecting to the network in response to an incoming call over the network, and means for transmitting a pre-determined identification code over the network subsequent to connecting to the network.

12. The system of claim 11 wherein the controller further comprises:

means for transmitting a pre-determined signal over the network, and timing means associated with the receiving means and the transmitting means for determining if the identification code is received within a pre-determined time of transmitting the signal; the responder further comprises:

means for receiving a pre-determined incoming test signal over the switched telecommunications network, means associated with the receiving means for determining that the signal is a valid test signal, and timing means associated with the transmitting means the determining means for causing the transmitting means to re-transmit the identification code if the signal is received within a pre-selected time period of the previous transmission of the identification code.

13. A method for testing a telecommunications network, the method comprising the steps of:

a. directing the network to complete a call from a first point on the network to second point on the network, b. returning an identification code from the second point to the first point; and c. determining whether the identification code matches the predetermine identification code of the second point.

14. The method of claim 13 further comprising the steps of:

a. repeatedly sending a first signal from the first point to the second point; and b. sending a second signal from the second point to the first point in response to each first signal.

15. The method of claim 14 further comprising the step of:

a. disconnecting the second point from the network, if a first signal is not received within a pre-selected time interval of the previous sending of a second signal.

* * * * *

UNITED STATES PATENT AND TRADEMARK OFFICE
CERTIFICATE OF CORRECTION

Page 1 of 2

PATENT NO. : 4,910,760
DATED : Mar. 20, 1990
INVENTOR(S) : Reformato

It is certified that error appears in the above—identified patent and that said Letters Patent is hereby corrected as shown below:

Col. 1, line 42 change "ar" to --are--; line 44 change "wit" to --with--; line 48, change "b" to --be--;
line 58 change "the" to --they--.
Col. 2 line 26, change "routines" to --routings--.
Col. 4, line 8, after "constitutes" insert --a--;
line 9 change "UURBA" to --MURBA--; line 22 change "represent" to --resend--; line 26 change "use" to --pulse--.
Col. 5, line 22 change "Rockwell-Hescom" to --Rockwell-Wescom;
line 27 change "compute" to --computer--; line 30 change "Rockwell-Hescom" to --Rockwell-Wescom; line 33 change"50B9" to --5089--; line 49 change "22" to --220--.
Col. 6, line 28 change "Rockwell-Hescom" to --Rockwell-Wescom--;
line 42 change "ill" to --will--; line 60 change "embodiment" to --embodiments--.
Col. 7, line 11 change "ith" to --with--; line 22 change "Toes" to --Tones.--; line 27 insert before "network interface" the word --a--.

UNITED STATES PATENT AND TRADEMARK OFFICE
CERTIFICATE OF CORRECTION

PATENT NO. : 4,910,760

DATED : March 20, 1990

INVENTOR(S) : Reformato

It is certified that error appears in the above-identified patent and that said Letters Patent is hereby corrected as shown below:

Col. 8, line 2 change "th" to --the--; line 17 change "destination.," to --destination;--; line 39 before "the determining" insert the word --and--; line 47 change "to second" to --to a second--; line 52 change "predetermine" to --predetermined--; line 62 delete the comma after the word "network".

Signed and Sealed this

Tenth Day of September, 1991

Attest:

HARRY F. MANBECK, JR.

Attesting Officer

Commissioner of Patents and Trademarks